United States Patent [19]

Seeney et al.

[11] Patent Number: 5,777,001

[45] Date of Patent: Jul. 7, 1998

[54] GRAFT POLYMERIZED METAL OXIDE COMPOSITIONS AND METHODS

[75] Inventors: Charles E. Seeney, Edmond; Tanna K. Watson, Oklahoma City, both of Okla.

[73] Assignee: Kerr McGee Chemical Corp., Oklahoma City, Okla.

[21] Appl. No.: 905,706

[22] Filed: Aug. 4, 1997

[51] Int. Cl.$^6$ ............................. C08K 9/00; C08K 9/04
[52] U.S. Cl. ..................... 523/205; 523/202; 524/260; 524/403; 524/423; 524/431; 106/439
[58] Field of Search ......................... 523/205, 202; 524/403, 431, 260, 423; 106/439

[56] References Cited

U.S. PATENT DOCUMENTS

| Re. 32,320 | 12/1986 | Jacobson | 428/530 |
|---|---|---|---|
| 4,129,549 | 12/1978 | Kahane | 260/40 |
| 4,315,959 | 2/1982 | Buys et al. | 427/214 |
| 4,461,810 | 7/1984 | Jacobson | 428/530 |
| 4,544,415 | 10/1985 | Franz et al. | 106/288 |
| 4,743,643 | 5/1988 | Butler | 524/396 |
| 4,910,113 | 3/1990 | Mori et al. | 430/106 |
| 4,983,681 | 1/1991 | Mori et al. | 525/290 |
| 5,075,401 | 12/1991 | Zhang | 527/201 |
| 5,137,575 | 8/1992 | Yasuki et al. | 106/441 |
| 5,472,491 | 12/1995 | Duschek et al. | 106/418 |

FOREIGN PATENT DOCUMENTS

| 93118970 | 11/1993 | European Pat. Off. |
| 1506236 | 4/1997 | United Kingdom |

OTHER PUBLICATIONS

Japanese Laid-Open Patent Application (Kokai) No. 55-23133 published Feb. 19, 1980.

Publication entitled "Graft Polymerization of Vinyl Monomers from Inorganic Ultrafine Particles Initiated by Azo Groups Introduced on the Surface" by Norio Tsubokawa, et al. published in the Polymer Journal vol. 22, No. 9, pp. 827-833 (1990).

*Primary Examiner*—Andrew E. C. Merriam

[57] ABSTRACT

The present invention provides modified particulate metal oxides having desired properties and methods of producing the metal oxides. The methods basically comprise the steps of reacting a particulate metal oxide in an aqueous solution or emulsion containing ceric ion to produce hydroxyl free radicals on the surfaces of the metal oxide and then reacting the metal oxide with a polymerizable vinyl monomer to graft the monomer to the metal oxide and polymerize the monomer. The graft polymerized metal oxide compositions produced have improved properties such as compatibility and ease of mixing with water based, oil based and plastics formulations.

37 Claims, No Drawings

GRAFT POLYMERIZED METAL OXIDE COMPOSITIONS AND METHODS

BACKGROUND OF THE INVENTION

1. Field of the Invention.

The present invention generally relates to modified particulate metal oxide compositions and methods, and more particularly, to such compositions and methods wherein vinyl monomers are graft polymerized onto metal oxides.

2. Description of the Prior Art.

Metal oxides have a variety of uses as additives in organic and aqueous compositions. For example, metal oxide pigments such as titanium dioxide are commonly utilized as UV light stabilizers, colorants, opacifiers and the like in a variety of materials such as oil and water based paints, paper, rubber, plastics, floor coverings, glassware, ceramics, inks, etc. Generally, particulate metal oxides are not readily dispersible in water based materials, oil based materials or plastic materials.

In the usual applications for particulate metal oxides, it is highly desirable that the metal oxides have compatibility and ease of mixing with water based, oil based and plastic formulations as well as other beneficial properties. Thus, there is a need for modified metal oxides which have desired properties and methods of producing such metal oxides.

SUMMARY OF THE INVENTION

The present invention provides methods of producing modified particulate metal oxides having desired properties and improved metal oxide compositions which meet the needs described above and overcome the deficiencies of the prior art. The methods of the invention basically comprise the steps of reacting a particulate metal oxide in an aqueous solution or emulsion containing ceric ion which produces hydroxyl free radicals on the surfaces of the particulate metal oxide. The particulate metal oxide containing surface hydroxyl free radicals is then reacted with a polymerizable vinyl monomer which initiates the polymerization of the monomer. The polymerization reaction propagates from the particulate metal oxide surfaces and the polymer-metal oxide formed is a modified product having properties of both the metal oxide and the grafted polymer.

It is, therefore, a general object of the present invention to provide improved particulate metal oxide compositions having desired properties and methods of producing such metal oxides.

Other and further objects, features and advantages of the present invention will be readily apparent to those skilled in the art upon a reading of the description of preferred embodiments which follows.

DESCRIPTION OF THE PREFERRED EMBODIMENTS

The present invention provides improved modified metal oxides by graft polymerization of vinyl monomers thereto. That is, a polymerizable vinyl monomer is attached to the surface of a particulate metal oxide by covalent bonding, and following graft polymerization, the metal oxide surface characteristics are modified whereby desired results are produced, e.g., improving the compatibility of the metal oxide with water based, oil based and plastic materials.

The present invention is particularly suitable for modifying metal oxide pigments to provide improved properties to the pigments. The metal oxide pigments which are suitable for modification in accordance with this invention are any of the known metal oxide pigments employed in surface coatings and materials, e.g., paint and plastic materials. Such metal oxides include, but are not limited to, titanium dioxide, iron oxide, zinc oxide, cobalt oxide, chromium oxide, lead oxide, and any of the foregoing metal oxides that have been surface treated with silica. The amenability of a specific metal oxide to the methods of this invention is dependent upon whether free radicals can be generated on the surfaces of the metal oxide. Without the generation of free radicals, the subsequent graft polymerization can not take place. The most preferred metal oxide pigment for use in accordance with the present invention is titanium dioxide.

In general, the titanium dioxide pigment utilized for preparing the improved pigment of this invention can be either the anatase or rutile crystalline structure or a combination thereof. The pigmentary titanium dioxide may be produced by way of various known commercial processes. For example, the particular pigment utilized can be one produced by the sulfate process or the vapor phase oxidation process, both of which are well known to those skilled in the art.

The methods of the present invention for producing modified particulate metal oxides having desired properties basically comprise the steps of reacting a particulate metal oxide in an aqueous solution or emulsion containing ceric IV ion to produce hydroxyl free radicals on the surfaces of the particulate metal oxide. Thereafter, the particulate metal oxide containing surface hydroxyl free radicals is reacted with a polymerizable vinyl monomer added to the reaction mixture whereby the monomer is grafted to the particulate metal oxide and the polymerization of the monomer is initiated. Propagation then proceeds by way of known free radical mechanisms to produce the modified particulate metal oxide.

The particular vinyl monomer utilized and the quantity of polymer grafted to the metal oxide affect the properties of the resulting product. For example, pigmentary size titanium dioxide particles can be reacted with a quantity of polystyrene whereby a thin polymer film is attached to each of the titanium dioxide particles. The resulting titanium dioxide particles have improved compatibility with and ease of incorporation in plastic formulations such as thermoplastic resins and color concentrates. Metal oxide particles graft polymerized to a 10–20% by weight quantity of polystyrene can be utilized as feed concentrates for the production of a wide range of color concentrates. Titanium dioxide particles, graft polymerized with electronically conductive monomers such as pyrrole can be utilized in a range of applications requiring electroconductive properties such as primer coatings in automobile applications. Titanium dioxide and other metal oxides can be graft polymerized with a range of vinyl monomers of varying performance characteristics to form surface modified metal oxides having desired properties for particular applications. The term "graft polymerized particulate metal oxide" is used herein to mean a metal oxide having polymer moieties covalently attached to the surfaces thereof.

In a preferred method of producing a graft polymerized particulate metal oxide having specific desired properties, the particulate metal oxide is first dispersed in an aqueous solution or emulsion to form a slurry thereof. The dispersion of the particulate metal oxide can be facilitated by adding one or more non-micellar surface active agents to the solution or emulsion which are well known to those skilled in the art.

In order to prepare the particulate metal oxide surfaces for the subsequent reactions, the aqueous solution utilized preferably is an aqueous organic acid solution having a pH in the range of from about 2 to about 6. The organic acid utilized can be selected from the group consisting of sulfuric acid and hydrochloric acid, most preferably sulfuric acid. The concentration of the organic acid in the aqueous solution is generally in the range of from about 1% to about 10% by weight of the solution.

After the particulate metal oxide has been dispersed and thoroughly mixed in the aqueous solution utilized, a ceric salt is mixed with the slurry and the resulting mixture is reacted to produce hydroxyl free radicals on the surfaces of the particulate metallic oxide. While various ceric salts can be utilized, a salt selected from the group of ceric ammonium nitrate, ceric ammonium sulfate, ceric nitrate, and ceric sulfate is preferred. The ceric salt is mixed with the slurry in an amount whereby the weight ratio of particulate metal oxide to ceric ion in the resulting slurry is in the range of from about 1:1 to about 50:1.

Generally, the particulate metal oxide is mixed with the aqueous solution to which it is added for a time period in the range of from about 1 to about 5 hours at room temperature prior to mixing a ceric salt with the slurry. Upon adding the ceric salt, the slurry is mixed at a temperature in the range of from about 25° C. to about 199° C. for a further time period up to about 10 hours to thereby react the mixture and produce hydroxyl free radicals on the surfaces of the particulate metal oxide.

A polymerizable vinyl monomer is next slowly added over a 2–3 hour period to the reaction mixture and allowed to react at a temperature in the range of from about 0° C. to about 100° C. for an additional time period of from about 5 to about 48 hours to graft and polymerize the monomer. As will be described further hereinbelow, the polymerizable vinyl monomer can be a water insoluble monomer or a water soluble monomer depending upon the desired properties of the finalized product. The polymerizable vinyl monomer used is generally added to the reaction mixture in an amount in the range of from about 50% to about 250% by weight of the particulate metal oxide in the mixture, but smaller or larger amounts may be used. The final reaction mixture produced is a slurry of graft polymerized particulate metal oxide and unreacted monomer. Some homopolymer may also be present which may or may not need to be separated depending on the application of the product. When the polymerized graft of the product is water soluble, the resulting reaction mixture is a viscous stable slurry of the product in water. In some applications the product will be separated by drying before use. When the polymerized graft of the product is water insoluble, the resulting reaction mixture is one of discrete particles in the aqueous media. The particles can be separated by filtration and washing.

The methods of producing graft polymerized particulate titanium dioxide pigment concentrates basically comprise the steps of dispersing a particulate titanium dioxide pigment in an aqueous solution or emulsion to form a slurry thereof and mixing a ceric salt with the slurry to form hydroxyl free radicals on the surfaces of the particulate titanium dioxide pigment. A polymerizable vinyl monomer is next slowly added to the reaction mixture. The reaction mixture is then allowed to react to graft the monomer to the particulate titanium dioxide pigment and polymerize the monomer. As mentioned above, the final reaction mixture containing the graft polymerized particulate titanium dioxide pigment product can be used directly, or the product can be recovered from the reaction mixture, depending on the specific requirements of the application for the product.

The particulate titanium dioxide pigment is also preferably dispersed in an aqueous organic acid solution. The pigment and acid solution are stirred at room temperature for a time period in the range of from about 1 to about 5 hours prior to mixing the ceric salt with the slurry. The ceric salt is preferably ceric ammonium nitrate or sulfate and after its addition, the mixture is reacted at a temperature in the range of from about 0° C. to about 100° C. for a time period up to about 10 hours. The water soluble or insoluble vinyl monomer is then slowly added to the reaction mixture and allowed to react for a time period of from about 5 to about 48 hours.

When a water insoluble vinyl monomer is utilized in producing a modified metal oxide product, the product produced has a greater compatibility and ease of mixing or incorporation in oil based and plastic formulations. Examples of suitable such water insoluble vinyl monomers include vinyl acetate, acrylonitriles, styrene, methyl acrylate and methyl methacrylate.

When the vinyl monomer utilized is a water soluble vinyl monomer, the product is more readily dispersible in water, aqueous solutions, aqueous paint formulations and the like. Suitable water soluble vinyl monomers include acrylamide, acrylic acid, quaternary ammonium compounds such as dimethyldiallylammonium chloride, and the like.

The graft polymerized metal oxide compositions produced in accordance with this invention can be recovered from the final reaction mixture utilizing known recovery techniques. For example, the product can be recovered from the reaction mixture by filtering the reaction mixture and then washing the recovered solid graft polymerized particulate metal oxide composition. When a water insoluble vinyl monomer is utilized in forming the particulate metal oxide product, unattached monomer and homopolymer can be removed if necessary using known recovery methods. As mentioned, when a water soluble monomer is used to form a water dispersible graft polymerized metal oxide product, the reaction mixture can be used directly as a prepaint composition or the like.

The modified particulate metal oxide compositions of this invention having improved properties are basically comprised of a particulate metal oxide having graft polymerized chains extending therefrom. The metal oxide forming the composition is preferably a pigment selected from the group of titanium dioxide, iron oxide, zinc oxide, cobalt oxide, chromium oxide and the foregoing compounds which have been treated with silicate. The polymerized vinyl monomer can be any vinyl monomer known to polymerize by way of free radical mechanisms, such as, but not limited to, vinyl acetate, acrylonitrile, styrene, pyrrole, acrylic acid, acrylamide, methyl acrylate, and methyl methacrylate.

The most preferred metal oxide pigment composition of this invention is particulate titanium dioxide pigment having polymerized vinyl monomer grafted thereto, the specific vinyl monomer utilized imparting desired properties to the pigment.

In order to further illustrate the graft polymerized metal oxide compositions and methods of this invention, the following examples are given.

EXAMPLE 1

150 grams of an aqueous slurry containing particulate titanium dioxide pigment in an amount of about 20–30% by weight of the slurry were added to 500 grams of distilled water and placed in a three necked reaction flask in a hood. A stirring motor and rod, condenser and collection flask, thermometer, and a nitrogen gas source were placed into the necks of the flask. The initial pH and temperature of the slurry were about 7° and 25° C., respectively. 1.77 grams of ceric ammonium nitrate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 70.05 grams of vinyl acetate were charged to the reaction flask at a slow addition rate over a time period of about 20 minutes. The reaction mixture was then allowed to react in a nitrogen atmosphere with stirring for an additional approximately 21 hours. The final temperature of the reaction mixture was 23° C. The graft vinyl acetate polymerized titanium dioxide composition produced was recovered after extraction of unreacted acetate monomer and polymerized monomer. The amount of recovered product was 186.78 grams. The graft yield was about 24.5%.

EXAMPLE 2

150 grams of an aqueous slurry containing particulate titanium dioxide pigment in an amount of 20–30% by weight of the slurry were added to 500 grams of distilled water and placed in a three necked reaction flask in a hood. A stirring motor and rod, condenser and collection flask, thermometer, and a nitrogen gas source were placed into the necks of the flask. The initial temperature of the slurry were about 7° and 25° C., respectively. 1.51 grams of ceric ammonium nitrate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 60.45 grams of acrylonitrile were charged to the reaction flask at a slow addition rate over a time period of about 20 minutes. The reaction mixture was then allowed to react in a nitrogen atmosphere with stirring for an additional approximately 23 hours. The graft acrylonitrile polymerized titanium dioxide composition produced was recovered after extraction of unreacted monomer and polymerized monomer. The amount of recovered product was 161.15 grams. The graft yield was about 7.43%.

EXAMPLE 3

100 grams of an aqueous slurry containing particulate titanium dioxide pigment in an amount of 20–30% by weight of the slurry were added to 250 grams of distilled water and placed in a three necked reaction flask in a hood. A stirring motor and rod, condenser and collection flask, thermometer, and a nitrogen gas source were placed into the necks of the flask. The initial pH and temperature of the slurry were about 5.3° and 52° C., respectively. 1.27 grams of ceric ammonium sulfate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 50.77 grams of methyl methacrylate were charged to the reaction flask at a slow addition rate over a time period of about 20 minutes. The reaction mixture was then allowed to react in a nitrogen atmosphere with stirring for an additional approximately 24 hours. The final temperature of the reaction mixture was about 53° C. The methyl methacrylate polymerized titanium dioxide composition produced was recovered after extraction of unreacted monomer and polymerized monomer. The amount of recovered product was 106.20 grams. The graft yield was 6.2%.

EXAMPLE 4

100 grams of an aqueous slurry containing particulate titanium dioxide pigment in an amount of 20–30% by weight of the slurry were added to 568 grams of 2.5 N nitric acid and placed in a three necked reaction flask in a hood. A stirring motor and rod, condenser and collection flask, thermometer, and a nitrogen gas source were placed into the necks of the flask. The initial temperature of the slurry was about 32° C. 5.5 grams of ceric ammonium nitrate initiator (about 11.8% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 39.6 grams of vinyl acetate and 7.17 grams of methyl acetate were charged to the reaction flask at a slow addition rate over a time period of about 20 minutes. The reaction mixture was then allowed to react in a nitrogen atmosphere with stirring for an additional approximately 9 hours. The graft polymerized titanium dioxide composition produced was recovered after extraction of unreacted monomer and polymerized monomer. The amount of recovered product was 112.37 grams. The graft yield was 12.4%.

EXAMPLE 5

100 grams of an aqueous slurry containing particulate titanium dioxide pigment in an amount of 20–30% by weight of the slurry were added to 250 grams of distilled water and placed in a three necked reaction flask in a hood. A stirring motor and rod, condenser and collection flask, thermometer, and a nitrogen gas source were placed into the necks of the flask. The initial temperature of the slurry was about 28° C. 1.13 grams of ceric ammonium sulfate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 45.29 grams of styrene were charged to the reaction flask at a slow addition rate over a time period of about 20 minutes. The reaction mixture was then allowed to react in a nitrogen atmosphere with stirring for an additional approximately 21 hours. The final temperature of the reaction mixture was 60.6° C. The graft polymerized titanium dioxide composition produced was recovered after extraction of unreacted monomer and polymerized monomer. The amount of recovered product was 158 grams. The graft yield was 58%.

EXAMPLE 6

100 grams of an aqueous slurry containing particulate titanium dioxide pigment in an amount of 20–30% by weight of the slurry were added to 250 grams of distilled water and placed in a three necked reaction flask in a hood. A stirring motor and rod, condenser and collection flask, thermometer, and a nitrogen gas source were placed into the necks of the flask. The initial pH and temperature of the slurry were about 3.5° and 27° C., respectively. 1.27 grams of ceric ammonium sulfate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 50.77 grams of methyl methacrylate were charged to the reaction flask at a slow addition rate over a time period of about 20 minutes. The reaction mixture was then allowed to react in a nitrogen atmosphere with stirring for an additional approximately 21 hours. The final temperature of the reaction mixture was about 53° C. The graft polymerized titanium dioxide composition produced was recovered after extraction of unreacted monomer and polymerized monomer. The amount of recovered product was 106.2 grams. The graft yield was 6.2%.

EXAMPLE 7

100 grams of an aqueous slurry containing particulate titanium dioxide pigment in an amount of 20–30% by weight of the slurry were added to 250 grams of distilled water and placed in a three necked reaction flask in a hood. A stirring motor and rod, condenser and collection flask, thermometer, and a nitrogen gas source were placed into the necks of the flask. The initial pH and temperature of the slurry were about 3.4° and 25° C., respectively. 1.20 grams of ceric ammonium sulfate initiator (2.5% by weight of the vinyl monomer subsequently added) were placed in the flask and the reaction mixture was allowed to react in a nitrogen atmosphere with stirring for approximately 3 hours during which time hydroxyl free radicals were formed on the surfaces of the particulate titanium dioxide. Thereafter, 47.8 grams of methyl acrylate were charged to the reaction flask at a slow addition rate over a time period of about 20 minutes. The reaction mixture was then allowed to react in a nitrogen atmosphere with stirring for an additional approximately 24 hours. The final temperature of the reaction mixture was 52.6° C. The graft polymerized titanium dioxide composition produced was recovered after extraction of unreacted monomer and polymerized monomer. The amount of recovered product was 121.89 grams. The graft yield was 21.89%.

EXAMPLE 8

An aqueous slurry containing about 50% by weight particulate titanium dioxide pigment and 250 grams of deionized water were added to a 3-necked reaction flask in a hood. A stirring motor and rod, condenser and collection flask, thermometer and a nitrogen gas source were placed into the necks of the flask. The initial temperature and pH of the aqueous titanium dioxide slurry were 4.1 and 25.3° C., respectively. The reaction flask was placed in an ice bath and a surfactant and ceric ammonium nitrate initiator were added to the reaction flask. The contents of the reaction flask were cooled to 12° C. The resulting reaction mixture was allowed to react in a nitrogen atmosphere for approximately 5 hours with stirring so that hydroxyl free radicals were formed on the surfaces of the particulate titanium dioxide pigment. Thereafter, 25 grams of acrylamide were dissolved in approximately 125 grams of deionized water and the resulting solution was slowly added to the reaction mixture at a rate of 2 drops per second over a time period of about 35 minutes. The resulting reaction mixture was allowed to react in a nitrogen atmosphere with stirring for an additional 9.5 hours whereupon the stirring stopped due to the solution becoming too viscous. An additional 100 grams of deionized water were added to the reaction mixture and the stirring was started again. The temperature of the reaction mixture was 20° C. at the time the additional water was added, and the reaction flask was cooled until the reaction mixture reached a temperature of 10° C. The reaction was allowed to proceed with stirring for an additional 6.5 hours whereupon the stirring was stopped and the ice bath removed. The resulting mixture containing graft polymerized acrylamide titanium dioxide was very viscous and weighed 730.1 grams.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of producing a modified particulate metal oxide having desired properties comprising the steps of:
   (a) reacting said particulate metal oxide in an aqueous solution or emulsion containing ceric ion to produce hydroxyl free radicals on the surfaces of said particulate metal oxide; and then
   (b) reacting said particulate metal oxide containing surface hydroxyl free radicals with a polymerizable vinyl monomer in the presence of said ceric ion to graft said monomer to said particulate metal oxide and polymerize said monomer.

2. The method of claim 1 wherein said metal oxide is a pigment selected from the group of titanium dioxide, iron oxide, zinc oxide, cobalt oxide, chromium oxide and lead oxide.

3. The method of claim 1 wherein said aqueous solution or emulsion containing ceric ion is an aqueous solution of a ceric salt selected from the group of ceric ammonium nitrate, ceric ammonium sulfate, ceric nitrate and ceric sulfate.

4. The method of claim 1 wherein said particulate metal oxide is dispersed in an aqueous organic acid solution having a pH in the range of from about 2 to about 6 prior to reacting it in the presence of said cerium ion in accordance with step (a).

5. The method of claim 1 wherein said polymerizable vinyl monomer is a water insoluble monomer selected from the group of vinyl acetate, acrylonitrile, styrene, methyl acrylate and methyl methacrylate.

6. The method of claim 1 wherein said polymerizable vinyl monomer is a water soluble monomer selected from the group of acrylamide, acrylic acid and dimethyldiallylammonium chloride.

7. The method of claim 1 wherein said particulate metal oxide is reacted with said aqueous solution containing ceric ion in accordance with step (a) in an amount whereby the weight ratio of particulate metal oxide to ceric ion is in the range of from about 1:1 to about 50:1.

8. The method of claim 7 wherein said polymerizable vinyl monomer is reacted with said particulate metal oxide containing surface hydroxyl radicals in accordance with step (b) in an amount in the range of from about 50% to about 250% by weight of said particulate metal oxide.

9. A method of producing a graft polymerized particulate titanium dioxide pigment having improved compatibility and ease of mixing with plastics comprising the steps of:
   (a) dispersing said particulate titanium dioxide pigment in an aqueous solution or emulsion to form a slurry thereof;
   (b) mixing a ceric salt with said slurry and reacting the resulting mixture to produce hydroxyl free radicals on the surfaces of said particulate titanium dioxide pigment;
   (c) mixing a polymerizable water insoluble vinyl monomer with the reaction mixture of step (b) and reacting the resulting mixture to graft said monomer to said particulate titanium dioxide pigment and polymerize said monomer; and (d) recovering graft polymerized particulate titanium dioxide pigment from the reaction mixture of step (c).

10. The method of claim 9 wherein said aqueous solution or emulsion utilized in step (a) is an aqueous organic acid solution having a pH in the range of from about 2 to about 6.

11. The method of claim 10 wherein said ceric salt utilized in step (b) is selected from the group of ceric ammonium nitrate, ceric ammonium sulfate, ceric nitrate and ceric sulfate.

12. The method of claim 11 wherein said polymerizable water insoluble vinyl monomer utilized in step (c) is selected from the group of vinyl acetate, acrylonitrile, styrene, methyl acrylate and methyl methacrylate.

13. The method of claim 12 wherein said ceric salt utilized in step (b) is mixed with said slurry in an amount whereby the weight ratio of particulate titanium dioxide pigment to ceric ion is in the range of from about 1:1 to about 50:1.

14. The method of claim 13 wherein said polymerizable vinyl monomer is mixed with said reaction mixture in accordance with step (c) in an amount in the range of from about 50% to about 250% by weight of said particulate titanium dioxide pigment in said reaction mixture.

15. A method of producing a graft polymerized titanium dioxide pigment dispersed in an aqueous solution or emulsion for use in forming paint and the like comprising the steps of:

(a) dispersing said particulate titanium dioxide pigment in an aqueous solution or emulsion to form a slurry thereof;

(b) mixing a ceric salt with said slurry and reacting the resulting mixture to produce hydroxyl free radicals on the surfaces of said particulate titanium dioxide pigment; and (c) mixing a polymerizable water soluble vinyl monomer with the reaction mixture of step (b) and reacting the resulting mixture to graft said monomer to said particulate titanium dioxide pigment and polymerize said monomer.

16. The method of claim 15 wherein said aqueous solution utilized in step (a) is an aqueous organic acid solution having a pH in the range of from about 2 to about 6.

17. The method of claim 16 wherein said ceric salt utilized in step (b) is selected from the group of ceric ammonium nitrate, ceric ammonium sulfate, ceric nitrate and ceric sulfate.

18. The method of claim 17 wherein said polymerizable water soluble vinyl monomer is selected from the group consisting of acrylamide, acrylic acid and dimethyldiallylammonium chloride.

19. The method of claim 18 wherein said ceric salt utilized in step (b) is mixed with said slurry in an amount whereby the weight ratio of particulate titanium dioxide pigment to ceric ion is in the range of from about 1:1 to about 50:1.

20. The method of claim 19 wherein said polymerizable water soluble vinyl monomer is mixed with said reaction mixture in accordance with step (c) in an amount in the range of from about 50% to about 250% by weight of said particulate titanium dioxide pigment in said reaction mixture.

21. A method of producing a graft polymerized titanium dioxide pigment which is readily dispersible in water comprising the steps of:

(a) dispersing said particulate titanium dioxide pigment in an aqueous solution to form a slurry thereof;

(b) mixing a ceric salt with said slurry and reacting the resulting mixture to produce hydroxyl free radicals on the surfaces of said particulate titanium dioxide pigment;

(c) mixing a polymerizable water soluble vinyl monomer with the reaction mixture of step (b) and reacting the resulting mixture to graft said monomer to said particulate titanium dioxide pigment and polymerize said monomer; and (d) recovering said graft polymerized particulate titanium dioxide pigment from the reaction mixture of step (c).

22. The method of claim 21 wherein said aqueous solution utilized in step (a) is an aqueous organic acid solution having a pH in the range of from about 2 to about 6.

23. The method of claim 22 wherein said ceric salt utilized in step (b) is selected from the group of ceric ammonium nitrate, ceric ammonium sulfate, ceric nitrate and ceric sulfate.

24. The method of claim 23 wherein said polymerizable water soluble vinyl monomer is selected from the group of acrylamide, acrylic acid and dimethyldiallylammonium chloride.

25. The method of claim 24 wherein said ceric salt utilized in step (b) is mixed with said slurry in an amount whereby the weight ratio of particulate titanium dioxide pigment to ceric ion is in the range of from about 1:1 to about 50:1.

26. The method of claim 25 wherein said polymerizable vinyl monomer is mixed with said reaction mixture in accordance with step (c) in an amount in the range of from about 50% to about 250% by weight of said particulate titanium dioxide pigment in said reaction mixture.

27. A plastics compatible graft polymerized particulate titanium dioxide pigment composition produced in accordance with the method of claim 9.

28. A plastics compatible graft polymerized particulate titanium dioxide pigment composition produced in accordance with the method of claim 14.

29. A composition comprising an aqueous dispersion of a graft polymerized particulate titanium dioxide pigment produced in accordance with the method of claim 15.

30. A composition comprising an aqueous dispersion of a graft polymerized particulate titanium dioxide pigment produced in accordance with the method of claim 20.

31. A graft polymerized titanium dioxide pigment composition which is dispersible in water produced in accordance with the method of claim 21.

32. A graft polymerized titanium dioxide pigment composition which is dispersible in water produced in accordance with the method of claim 26.

33. A modified particulate metal oxide composition having improved properties comprising a particulate metal oxide having polymerized vinyl monomers grafted thereto.

34. The composition of claim 33 wherein said metal oxide is selected from the group consisting of titanium dioxide, iron oxide, zinc oxide, cobalt oxide, chromium oxide and lead oxide.

35. The composition of claim 33 wherein said vinyl monomer is selected from the group of vinyl acetate, acrylonitrile, styrene, n-vinyl pyrrolidone, acrylamide, acrylic acid and dimethyldiallylammonium chloride.

36. The pigment composition of claim 33 wherein said metal oxide pigment is titanium dioxide.

37. The pigment composition of claim 36 wherein said vinyl monomer is selected from the group consisting of vinyl acetate, acrylonitrile, styrene, n-vinyl pyrrolidone, acrylamide, acrylic acid and dimethyldiallylammonium chloride.

* * * * *